United States Patent
Kudo

(10) Patent No.: US 12,078,622 B2
(45) Date of Patent: Sep. 3, 2024

(54) QUANTITATIVE DETERMINATION DEVICE FOR BROMINATED FLAME-RETARDANT COMPOUNDS

(71) Applicant: SHIMADZU CORPORATION, Kyoto (JP)

(72) Inventor: Yukihiko Kudo, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 63 days.

(21) Appl. No.: 17/697,364

(22) Filed: Mar. 17, 2022

(65) Prior Publication Data
US 2022/0373520 A1    Nov. 24, 2022

(30) Foreign Application Priority Data
May 20, 2021   (JP) .................................. 2021-085153

(51) Int. Cl.
| | | |
|---|---|---|
| G01N 30/72 | (2006.01) | |
| G01N 30/86 | (2006.01) | |
| G01N 30/88 | (2006.01) | |
| G01N 30/02 | (2006.01) | |
| G01N 30/04 | (2006.01) | |
| G01N 30/62 | (2006.01) | |

(52) U.S. Cl.
CPC ..... *G01N 30/7206* (2013.01); *G01N 30/8634* (2013.01); *G01N 30/8668* (2013.01);
(Continued)

(58) Field of Classification Search
None
See application file for complete search history.

(56) References Cited

U.S. PATENT DOCUMENTS

| | | |
|---|---|---|
| 2003/0229451 A1 | 12/2003 | Hamilton et al. |
| 2016/0266074 A1* | 9/2016 | Ueno ................ G01N 30/06 |

(Continued)

FOREIGN PATENT DOCUMENTS

| | | | |
|---|---|---|---|
| CN | 108139356 A * | 6/2018 | ........ G01N 27/626 |
| CN | 109564202 A | 4/2019 | |

(Continued)

OTHER PUBLICATIONS

Yukihiko Kudo, et al., "Development of a screening method for phthalate esters in polymers using a quantitative database in combination with pyrolyzer/thermal desorption gas chromatography mass spectrometry", Journal of Chromatography A, vol. 1602, 2019, pp. 441-449.

(Continued)

*Primary Examiner* — Daniel S Larkin
(74) *Attorney, Agent, or Firm* — Sughrue Mion, PLLC

(57) ABSTRACT

In a quantitative determination device 10 for brominated flame-retardant compounds, a storage section 41 holds a relative response factor 411 representing a relationship of a measured intensity of a compared compound to that of a reference compound selected from target compounds. A standard-sample measurer 43 acquires the intensity of the reference compound by measuring a standard sample, using an analyzer 10, 20. A target-sample measurer 45 acquires the intensities of the reference and compared compounds by measuring a target sample, using the analyzer. A reference-compound quantity determiner 46 determines a quantitative value of the reference compound in the target sample. A compared-compound quantity determiner 47 determines a quantitative value of the compared compound based on the quantity of the reference compound in the standard sample, intensity of the reference compound acquired by the standard-sample measurer, intensity of the compared compound (Continued)

acquired by the target-sample measurer, and relative response factor of the compared compound.

11 Claims, 12 Drawing Sheets

(52) U.S. Cl.
CPC ......... *G01N 30/8679* (2013.01); *G01N 30/88* (2013.01); *G01N 2030/025* (2013.01); *G01N 2030/047* (2013.01); *G01N 2030/626* (2013.01); *G01N 2030/8804* (2013.01); *G01N 2030/8845* (2013.01)

(56) References Cited

U.S. PATENT DOCUMENTS

| | | |
|---|---|---|
| 2017/0199166 A1 | 7/2017 | Hong et al. |
| 2019/0162707 A1 | 5/2019 | Strauch |
| 2022/0050080 A1 | 2/2022 | Kudo |

FOREIGN PATENT DOCUMENTS

| | | | | |
|---|---|---|---|---|
| JP | 2012037385 A | * | 2/2012 | |
| JP | 2015212642 A | * | 11/2015 | |
| WO | WO-2018019903 A1 | * | 2/2018 | ............ G01N 30/04 |
| WO | WO-2018198207 A1 | * | 11/2018 | ........... G01N 27/623 |
| WO | 2020/129129 A1 | | 6/2020 | |
| WO | 2020/152800 A1 | | 7/2020 | |
| WO | 2020/161849 A1 | | 8/2020 | |

OTHER PUBLICATIONS

"Certificate of Analysis ERM-EC591", Joint Research Centre, Institute for Reference Materials and Measurements, European Reference Materials, 2008, pp. 1-4.

Chinese Office Action dated Sep. 1, 2023 in Chinese Application No. 202210282103.6.

Office Action issued Jul. 2, 2024 in Japanese Application No. 2021-085153.

* cited by examiner

Fig. 2

| Parameters | Settings | | |
|---|---|---|---|
| Pyrolyzer | | | |
| Furnace temperature: | 200 °C → 20 °C/min → 300 °C → 5 °C/min → 340°C (1 min) | | |
| Interface temperature: | 300 °C (interface temperature control mode: manual) | | |
| GC | | | |
| Injection port temperat | 300 °C | | |
| Column oven tempera | 80 °C → (20 °C /min) → 300 °C (5 min) | | |
| Injection mode: | Split (split ratio: 1/50) | | |
| Carrier gas: | Helium | | |
| Carrier gas flow: | 52.1 cm/s, constant linear velocity | | |
| MS | | | |
| Ion source temperatur | 230 °C | | |
| Ionization method: | Electron ionization (EI), 70 eV. | | |
| Analytical mode: | Scan/SIM simultaneous mode* | | |
| Scan range: | m/z 50 to m/z 1000 | | |
| | | Quantification ion | Reference ion 1 |
| | Mono-BB | 233.9 | 231.9 |
| | Di-BB | 313.8 | 311.8 |
| | Tri-BB | 389.8 | 391.8 |
| | Tetra-BB | 467.6 | 309.8 |
| | Penta-BB | 545.6 | 387.7 |
| | Hexa-BB | 467.6 | 627.5 |
| | Hepta-BB | 545.6 | 705.4 |
| | Octa-BB | 625.5 | 627.5 |
| | Nona-BB | 703.4 | 863.3 |
| Monitoring mass ions | Deca-BB | 783.3 | 785.3 |
| for SIM analysis: | Mono-BDE | 247.9 | 249.9 |
| | Di-BDE | 327.8 | 329.8 |
| | Tri-BDE | 405.8 | 407.8 |
| | Tetra-BDE | 325.8 | 483.6 |
| | Penta-BDE | 403.8 | 561.6 |
| | Hexa-BDE | 483.6 | 643.5 |
| | Hepta-BDE | 561.6 | 721.4 |
| | Octa-BDE | 641.5 | 643.5 |
| | Nona-BDE | 719.4 | 879.2 |
| | Deca-BDE | 799.3 | 959.1 |

Fig. 4

|  | Mono-BDE | Di-BDE | Tri-BDE | ... | Deca-BB |
|---|---|---|---|---|---|
| Mono-BDE | -- | Mono-BDE/Di-BDE | Mono-BDE/Tri-BDE | ... | Mono-BDE/Deca-BB |
| Di-BDE | Di-BDE/Mono-BDE | -- | Di-BDE/Tri-BDE | ... | Di-BDE/Deca-BB |
| Tri-BDE | Tri-BDE/Mono-BDE | Tri-BDE/Di-BDE | -- | ... | Tri-BDE/Deca-BB |
| Tetra-BDE | Tetra-BDE/Mono-BDE | Tetra-BDE/Di-BDE | Tetra-BDE/Tri-BDE | ... | Tetra-BDE/Deca-BB |
| Penta-BDE | Penta-BDE/Mono-BDE | Penta-BDE/Di-BDE | Penta-BDE/Tri-BDE | ... | Penta-BDE/Deca-BB |
| Hexa-BDE | Hexa-BDE/Mono-BDE | Hexa-BDE/Di-BDE | Hexa-BDE/Tri-BDE | ... | Hexa-BDE/Deca-BB |
| Hepta-BDE | Hepta-BDE/Mono-BDE | Hepta-BDE/Di-BDE | Hepta-BDE/Tri-BDE | ... | Hepta-BDE/Deca-BB |
| Octa-BDE | Octa-BDE/Mono-BDE | Octa-BDE/Di-BDE | Octa-BDE/Tri-BDE | ... | Octa-BDE/Deca-BB |
| Nona-BDE | Nona-BDE/Mono-BDE | Nona-BDE/Di-BDE | Nona-BDE/Tri-BDE | ... | Nona-BDE/Deca-BB |
| Deca-BDE | Deca-BDE/Mono-BDE | Deca-BDE/Di-BDE | Deca-BDE/Tri-BDE | ... | Deca-BDE/Deca-BB |
| Mono-BB | Mono-BB/Mono-BDE | Mono-BB/Di-BDE | Mono-BB/Tri-BDE | ... | Mono-BB/Deca-BB |
| Di-BB | Di-BB/Mono-BDE | Di-BB/Di-BDE | Di-BB/Tri-BDE | ... | Di-BB/Deca-BB |
| Tri-BB | Tri-BB/Mono-BDE | Tri-BB/Di-BDE | Tri-BB/Tri-BDE | ... | Tri-BB/Deca-BB |
| Tetra-BB | Tetra-BB/Mono-BDE | Tetra-BB/Di-BDE | Tetra-BB/Tri-BDE | ... | Tetra-BB/Deca-BB |
| Penta-BB | Penta-BB/Mono-BDE | Penta-BB/Di-BDE | Penta-BB/Tri-BDE | ... | Penta-BB/Deca-BB |
| Hexa-BB | Hexa-BB/Mono-BDE | Hexa-BB/Di-BDE | Hexa-BB/Tri-BDE | ... | Hexa-BB/Deca-BB |
| Hepta-BB | Hepta-BB/Mono-BDE | Hepta-BB/Di-BDE | Hepta-BB/Tri-BDE | ... | Hepta-BB/Deca-BB |
| Octa-BB | Octa-BB/Mono-BDE | Octa-BB/Di-BDE | Octa-BB/Tri-BDE | ... | Octa-BB/Deca-BB |
| Nona-BB | Nona-BB/Mono-BDE | Nona-BB/Di-BDE | Nona-BB/Tri-BDE | ... | Nona-BB/Deca-BB |
| Deca-BB | Deca-BB/Mono-BDE | Deca-BB/Di-BDE | Deca-BB/Tri-BDE | ... | -- |

Fig. 5

| Target Component | Reference | RRF |
|---|---|---|
| Mono-BDE | Tetra-BDE | 1.93 |
| Di-BDE | Tetra-BDE | 1.92 |
| Tri-BDE | Tetra-BDE | 0.93 |
| Tetra-BDE | Absolute Calibration | - |
| Penta-BDE | Absolute Calibration | - |
| Hexa-BDE | Penta-BDE | 1.03 |
| Hepta-BDE | Penta-BDE | 0.71 |
| Octa-BDE | Deca-BDE | 1.96 |
| Nona-BDE | Deca-BDE | 1.50 |
| Deca-BDE | Absolute Calibration | - |
| Mono-BB | Tetra-BDE | 2.78 |
| Di-BB | Tetra-BDE | 1.26 |
| Tri-BB | Tetra-BDE | 1.63 |
| Tetra-BB | Tetra-BDE | 0.46 |
| Penta-BB | Penta-BDE | 0.38 |
| Hexa-BB | Penta-BDE | 0.43 |
| Hepta-BB | Penta-BDE | 0.29 |
| Octa-BB | Deca-BB | 1.32 |
| Nona-BB | Deca-BB | 1.16 |
| Deca-BB | Absolute Calibration | - |

Fig. 6

| Target Component | Reference | %RSD of RRF (Each Lab n=3; Total n=12) |
|---|---|---|
| Mono-BDE | Tetra-BDE | 11.8 |
| Di-BDE | Tetra-BDE | 8.1 |
| Tri-BDE | Tetra-BDE | 6.5 |
| Tetra-BDE | Absolute Calibration | - |
| Penta-BDE | Absolute Calibration | - |
| Hexa-BDE | Penta-BDE | 5.7 |
| Hepta-BDE | Penta-BDE | 6.6 |
| Octa-BDE | Deca-BDE | 13.5 |
| Nona-BDE | Deca-BDE | 8.2 |
| Deca-BDE | Absolute Calibration | - |
| Mono-BB | Tetra-BDE | 11.8 |
| Di-BB | Tetra-BDE | 4.7 |
| Tri-BB | Tetra-BDE | 5.6 |
| Tetra-BB | Tetra-BDE | 5.5 |
| Penta-BB | Penta-BDE | 7.6 |
| Hexa-BB | Penta-BDE | 4.8 |
| Hepta-BB | Penta-BDE | 10.0 |
| Octa-BB | Deca-BB | 10.3 |
| Nona-BB | Deca-BB | 9.9 |
| Deca-BB | Absolute Calibration | - |

1. Mono-BDE (233.9), 2. Mono-BB (247.9), 3. Di-BB (313.8), 4.Di-BDE (327.8), 5. Tri-BDE (389.8), 6. Tri-BB (405.8), 7. Tetra-BB (467.6), 8. Tetra-BDE (325.8), 9. Penta-BB (545.6), 10. Penta-BDE (403.8), 11. Hexa-BB (467.6), 12. Hexa-BDE (483.6), 13. Hepta-BDE (561.6), 14. Hepta-BB (545.6), 15. Octa-BDE (641.5), 16. Octa-BB (625.5), 17. Nona-BB (703.4), 18. Nona-BDE (719.4), 19. Deca-BB (783.3), 20. Deca-BDE (799.3)

Fig. 10

| Compound Name | Concentration Value mg/kg 500 mg/kg (1000 mg/kg for Deca-BDE only) | Recovery Rate (%) 500 mg/kg (1000 mg/kg for Deca-BDE only) |
|---|---|---|
| Mono-BDE | 461.2 | 92.2 |
| Di-BDE | 487.3 | 97.5 |
| Tri-BDE | 487.5 | 97.5 |
| Tetra-BDE | 503.2 | 100.6 |
| Penta-BDE | 554.1 | 110.8 |
| Hexa-BDE | 597.2 | 119.4 |
| Hepta-BDE | 619.5 | 123.9 |
| Octa-BDE | 513.6 | 102.7 |
| Nona-BDE | 544 | 108.8 |
| Deca-BDE | 1235.3 | 123.5 |
| Mono-BB | 459.2 | 91.8 |
| Di-BB | 471.6 | 94.3 |
| Tri-BB | 476.3 | 95.3 |
| Tetra-BB | 499.2 | 99.8 |
| Penta-BB | 602 | 120.4 |
| Hexa-BB | 563.6 | 112.7 |
| Hepta-BB | 570.4 | 114.1 |
| Octa-BB | 483.5 | 96.7 |
| Nona-BB | 619.8 | 124 |
| Deca-BB | 502.3 | 100.5 |
| Total PBDEs | 6002.9 | 109.1 |
| Total PBBs | 5247.7 | 105 |

Fig. 11

| Parameters | Settings |
|---|---|
| Pyrolyzer | |
| Furnace temperature: | 340°C (3 min) |
| Interface temperature: | 300 °C (interface temperature control mode: manual) |
| GC | |
| Injection port temperat | 300 °C |
| Column oven tempera | 80 °C → (40 °C /min) →200 °C → (20 °C /min)→320 °C (4 min) |
| Injection mode: | Split (split ratio: 1/50) |
| Carrier gas: | Helium |
| Carrier gas flow: | 52.1 cm/s, constant linear velocity |
| MS | |
| Ion source temperatur | 230 °C |
| Ionization method: | Electron ionization (EI), 70 eV. |
| Analytical mode: | Scan/SIM simultaneous mode |
| Scan range: | $m/z$ 50 to $m/z$ 1000 |

|  | | Quantification ion | Reference ion 1 |
|---|---|---|---|
| | Mono-BB | 233.9 | 231.9 |
| | Di-BB | 313.8 | 311.8 |
| | Tri-BB | 389.8 | 391.8 |
| | Tetra-BB | 467.6 | 309.8 |
| | Penta-BB | 545.6 | 387.7 |
| | Hexa-BB | 467.6 | 627.5 |
| | Hepta-BB | 545.6 | 705.4 |
| | Octa-BB | 625.5 | 627.5 |
| Monitoring mass ions | Nona-BB | 703.4 | 863.3 |
| for SIM analysis: | Deca-BB | 783.3 | 785.3 |
| | Mono-BDE | 247.9 | 249.9 |
| | Di-BDE | 327.8 | 329.8 |
| | Tri-BDE | 405.8 | 407.8 |
| | Tetra-BDE | 325.8 | 483.6 |
| | Penta-BDE | 403.8 | 561.6 |
| | Hexa-BDE | 483.6 | 643.5 |
| | Hepta-BDE | 561.6 | 721.4 |
| | Octa-BDE | 641.5 | 643.5 |
| | Nona-BDE | 719.4 | 879.2 |
| | Deca-BDE | 799.3 | 959.1 |

Fig. 12

| Target Component | Reference | RRF |
|---|---|---|
| Mono-BDE | Tetra-BDE | 1.68 |
| Di-BDE | Tetra-BDE | 1.80 |
| Tri-BDE | Tetra-BDE | 0.92 |
| Tetra-BDE | Absolute Calibration | - |
| Penta-BDE | Absolute Calibration | - |
| Hexa-BDE | Penta-BDE | 1.02 |
| Hepta-BDE | Penta-BDE | 0.73 |
| Octa-BDE | Deca-BDE | 1.84 |
| Nona-BDE | Deca-BDE | 1.42 |
| Deca-BDE | Absolute Calibration | - |
| Mono-BB | Tetra-BDE | 2.45 |
| Di-BB | Tetra-BDE | 1.22 |
| Tri-BB | Tetra-BDE | 1.64 |
| Tetra-BB | Tetra-BDE | 0.47 |
| Penta-BB | Penta-BDE | 0.39 |
| Hexa-BB | Penta-BDE | 0.44 |
| Hepta-BB | Penta-BDE | 0.30 |
| Octa-BB | Deca-BB | 1.24 |
| Nona-BB | Deca-BB | 1.06 |
| Deca-BB | Absolute Calibration | - |

Fig. 13

| Target Component | Reference | %RSD of RRF (Each Lab n=3; Total n=12) |
|---|---|---|
| Mono-BDE | Tetra-BDE | 6.5 |
| Di-BDE | Tetra-BDE | 3.2 |
| Tri-BDE | Tetra-BDE | 2.2 |
| Tetra-BDE | Absolute Calibration | - |
| Penta-BDE | Absolute Calibration | - |
| Hexa-BDE | Penta-BDE | 0.9 |
| Hepta-BDE | Penta-BDE | 3.7 |
| Octa-BDE | Deca-BDE | 7.7 |
| Nona-BDE | Deca-BDE | 4.9 |
| Deca-BDE | Absolute Calibration | - |
| Mono-BB | Tetra-BDE | 11.2 |
| Di-BB | Tetra-BDE | 4.3 |
| Tri-BB | Tetra-BDE | 4.9 |
| Tetra-BB | Tetra-BDE | 5.1 |
| Penta-BB | Penta-BDE | 3.8 |
| Hexa-BB | Penta-BDE | 4.8 |
| Hepta-BB | Penta-BDE | 6.3 |
| Octa-BB | Deca-BB | 5.1 |
| Nona-BB | Deca-BB | 3.5 |
| Deca-BB | Absolute Calibration | - |

Fig. 14

| Target Component | Reference | RRF |
|---|---|---|
| HBCDD | Penta-BDE | 0.206 |
| TBBPA | Penta-BDE | 0.631 |

Fig. 15

| Target Component | Reference | RRF |
|---|---|---|
| HBCDD | Penta-BDE | 0.081 |
| TBBPA | Penta-BDE | 0.746 |

QUANTITATIVE DETERMINATION DEVICE FOR BROMINATED FLAME-RETARDANT COMPOUNDS

TECHNICAL FIELD

The present invention relates to a technique for the quantitative determination of brominated flame-retardant compounds.

BACKGROUND ART

Polybrominated biphenyls (PBBs, molecular formula $C_{12}H_{(10-n)}Br_n$, $1 \leq n \leq 10$) and polybrominated diphenyl ethers (PBDEs, molecular formula $C_{12}H_{(10-m)}Br_mO$, $1 \leq m10$), both of which are brominated flame-retardant compounds, are designated as restricted substances in the RoHS (Restriction of Hazardous Substances) directive. According to the directive, the total amounts of the ten kinds of PBBs and. PBDEs contained in each part of an electrical electronic device product to be exported to the EU should not be permitted to exceed 1000 mg/kg for each of the two groups of compounds.

A conventional method for measuring the content of the PBBs or PBDEs is as follows: A standard sample in which the ten kinds of PBBs, with the aforementioned value of n ranging from 1 (Mono) to 10 (Deca), or the ten kinds of PBDEs, with the aforementioned value of m ranging from 1 (Mono) to 10 (Deca), are respectively contained at known concentrations is subjected to a measurement beforehand by gas chromatography/mass spectrometry (GC/MS) to obtain the retention time and peak intensity of each compound, and then prepare a calibration curve for each compound. At a later time, in a measurement of a real sample, PBBs and PBDEs are extracted from the sample by a pretreatment, such as a solvent extraction or thermal extraction, and a GC/MS measurement of the PBBs and PBDEs is performed to create a chromatogram and identify the peak of each compound based on its retention time. The content of each compound is determined by comparing its peak intensity with the calibration curve of the compound concerned.

CITATION LIST

Patent Literature

Patent Literature 1: WO 2020/129129 A
Patent Literature 2: WO 2020/152800 A
Patent Literature 3: WO 2020/161849 A

Non Patent Literature

Non Patent Literature 1: Yukihiko Kudo, et al., "Development of a screening method for phthalate esters in polymers using a quantitative database in combination with pyrolyzer/thermal desorption gas chromatography mass spectrometry", *Journal of Chromatography A*, Volume 1602, 27 Sep. 2019, pages 441-449

SUMMARY OF INVENTION

Technical Problem

Generally speaking, the previously described measurement requires a labor-consuming task for newly preparing a calibration curve for each of the ten kinds of PBBs and ten kinds of PBDEs on each day of the analysis. Additionally, a mixed standard solution containing all of these compounds is expensive and may be difficult to procure. Furthermore, two or more mass spectrometers may be used when there are a considerable number of target samples. In that case, the task of preparing a calibration curve for each of the ten kinds of PBBs and ten kinds of PBDEs by the previously described measurement must be performed for each of the mass spectrometers, which consumes an even greater amount of time and labor.

The problem to be solved by the present invention is to provide a technique by which the quantities of brominated flame-retardant compounds can be conveniently determined when it is difficult to prepare calibration curves using a mixed solution containing the ten kinds of PBBs and ten kinds of PBDEs, or when a plurality of analyzers of the same type are used for an analysis of samples.

Solution to Problem

A quantitative determination device for brominated flame-retardant compounds according to the present invention developed for solving the previously described problem includes:

a storage section holding a relative response factor which represents a relationship of an intensity per unit quantity of a compared compound measured under a predetermined condition, to an intensity per unit quantity of a reference compound measured by a predetermined analyzing method under the predetermined condition, where the reference compound is one of a plurality of target compounds which constitute a portion or the entirety of the group of polybrominated biphenyls and polybrominated diphenyl ethers, while the compared compound is one of the target compounds different from the reference compound;

an analyzer configured to analyze a sample by the predetermined analyzing method;

a standard-sample measurer configured to acquire an intensity of the reference compound by performing a measurement of a standard sample under the predetermined condition, using the analyzer, with the standard sample containing the reference compound in known quantity;

a target-sample measurer configured to acquire intensities of the reference compound and the compared compound contained in a target sample by performing a measurement of the target sample under the predetermined condition, using the analyzer;

a reference-compound quantity deteririiner configured to determine a quantitative value of the reference compound contained in the target sample, based on the quantity of the reference compound contained in the standard sample, the intensity of the reference compound acquired by the standard-sample measurer, and the intensity of the reference compound acquired by the target-sample measurer; and a compared-compound quantity determiner configured to determine a quantitative value of the compared compound, based on the quantity of the reference compound contained in the standard sample, the intensity of the reference compound acquired by the standard-sample measurer, the intensity of the compared compound acquired by the target-sample measurer, and the relative response factor of the compared compound.

Advantageous Effects of Invention

According to the present invention, a reference compound is selected from a plurality of target compounds which constitute a portion or the entirety of the group of polybrominated biphenyls and polybrominated diphenyl ethers. A relative response factor which represents a relationship of a measured intensity per unit quantity of a compared compound (which is a target compound different from the reference compound) to a measured intensity per unit quantity of the reference compound is determined and stored beforehand in the storage section. In a measurement of a target sample, a calibration curve prepared by a measurement using a standard sample is used only for the determination of the quantitative value of the reference compound; the quantitative value for the compared compound is determined from the measured intensity and relative response factor of that compared compound, as well as the measured intensity of the reference compound acquired by the measurement of the standard sample and the known quantity of the reference compound contained in the standard sample.

According to the present invention, the relative response factor of each target compound to the reference compound is determined beforehand. After that, the task of preparing a calibration curve for each analyzer is performed only for that reference compound. Therethre, when it is difficult to prepare calibration curves using a mixed solution containing all PBBs and PBDEs, or when a plurality of analyzers of the same type are used, the quantities of the brominated flame-retardant compounds can be conveniently determined.

BRIEF DESCRIPTION OF DRAWINGS

FIG. 2 is an example of the measurement condition used in the present embodiment.

FIG. 4 is an example of a relative-response-factor matrix in the present embodiment.

FIG. 5 is an example of a relative-response-factor table in the present embodiment.

FIG. 6 is an example showing a correspondence relationship between the reference compound and the compared compound as well as the coefficient of variation of the relative response factor in the present embodiment.

FIG. 10 is a table showing the quantitative determination result and the recovery rate of each compound in the present embodiment.

FIG. 11 is another example of the measurement condition used in the present embodiment.

FIG. 12 is another example of the relative-response-factor table in the present embodiment FIG. 13 is another example showing a correspondence relationship between the reference compound and the compared compound as well as the coefficient of variation of the relative response factor in the present embodiment.

FIG. 14 is an example showing the correspondence relationship of the target compounds to the reference compound and the relative response factor in the case where TBBPA and HBCDD are included in the target compounds in the present embodiment.

FIG. 15 is another example showing the correspondence relationship of the target compounds to the reference compound and the relative response factor in the case where TBBPA and HBCDD are included in the target compounds in the present embodiment.

DESCRIPTION OF EMBODIMENTS

One embodiment of the quantitative determination device for brominated flame-retardant compounds according to the present invention is hereinafter described with reference to the drawings. The present embodiment is concerned with the case of screening target samples by determining the quantities of polybrominated biphenyls (PBBs, molecular formula $C_{12}H_{(10-n)}Br_n$, $1 \leq n \leq 10$) and polybrominated diphenyl ethers (PBDEs, molecular formula $C_{12}H_{(10-m)}Br_mO$, $1 \leq m \leq 10$), using a pyrolyzer gas chromatograph mass spectrometer (Py-GC-MS). The target samples in the present embodiment include polymer products regulated under the RoHS directive as well as other related articles.

1. Configuration of Py-GC-MS for Creating Relative-Response-Factor Database

Figure 1:
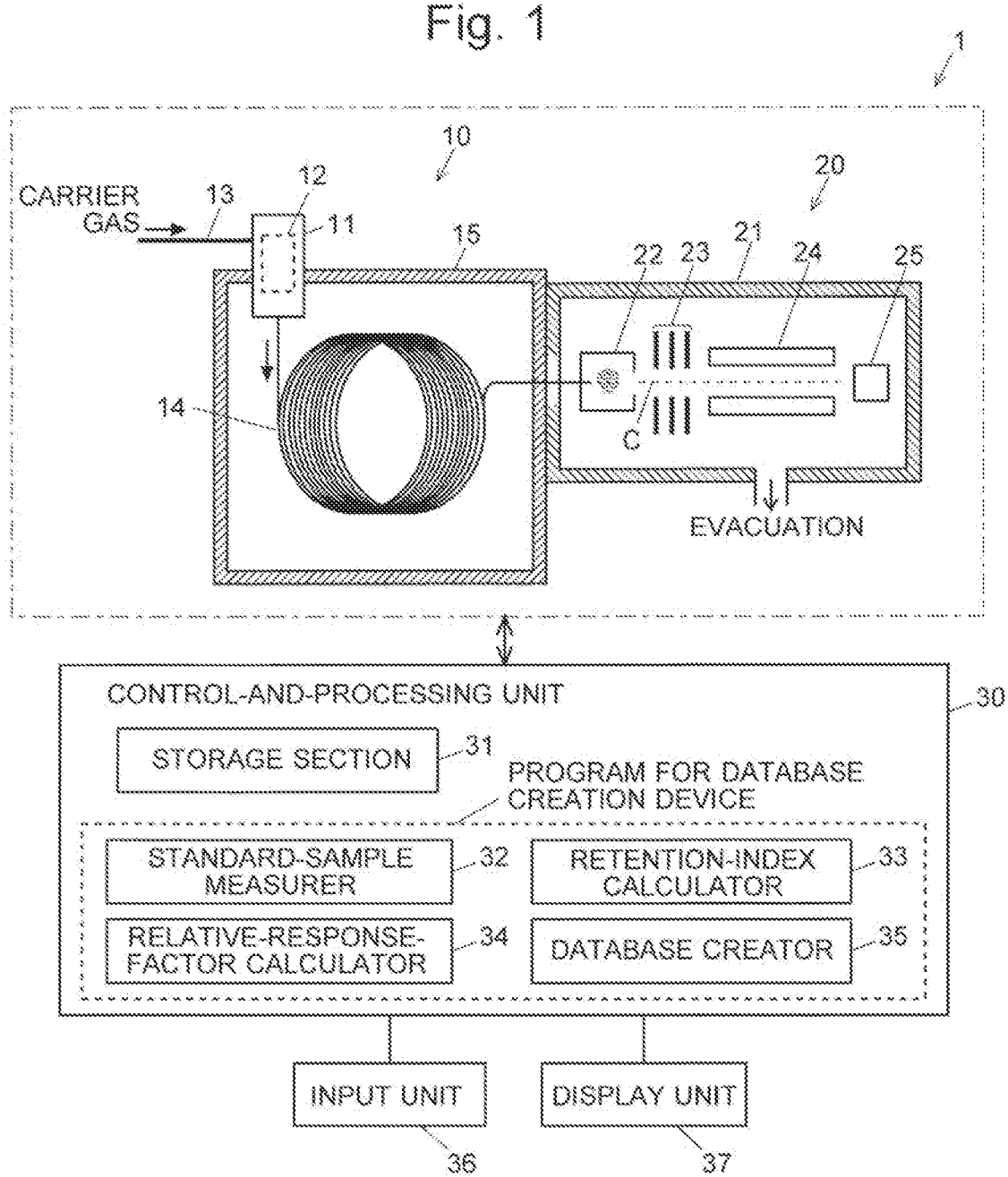
FIG. 1 is a configuration diagram of the main components of one embodiment of a gas chromatograph mass spectrometer used for preparing a relative-response-factor database in the present invention.

FIG. 1 shows the configuration of the main components of a Py-GC-MS 1 (first analyzer) used for preparing a relative-response-factor database to be used for the quantitative determination of the PBBs and PBDEs in the present embodiment.

The Py-GC-MS 1 roughly consists of a gas chromatograph unit 10, mass spectrometry unit 20, and control-and-processing unit 30. The gas chromatograph unit 10 includes: a sample vaporization chamber 11; a pyrolyzer 12 provided within the sample vaporization chamber 11; a carrier gas passage 13 connected to the sample vaporization chamber 11; and a column 14 connected to the exit port of the sample vaporization chamber 11. The column 14 is contained in a column oven 15. The pyrolyzer 12 and the column 14 in the column oven 15 are individually heated to a predetermined temperature by a heating mechanism (not shown), In the present embodiment, a column which enables a simultaneous analysis of PBBs and PBDEs is used as the column 14. For example, taking into account the fact that PBBs and PBDEs are highly polar compounds, it is preferable, but not always necessary, to use a column in which the liquid phase is a non-polar substance, with the film thickness of the liquid phase equal to or smaller than 10 μm. The length of the column may be appropriately determined according to the kind and film thickness of the selected liquid phase. For example, the UA-PBDE column (manufactured by Frontier Laboratories Ltd,; liquid phase, 100% Dimethyl polysiloxane; length, 15 m; inner diameter, 0.25 mm; and film thickness, 0.05 μm) or SH-IMS column including a guard column (manufactured by Shimadzu Corporation; liquid phase, 100% Dimethyl polysiloxane; length, 17 m; inner diameter, 0.25 mm: and film thickness, 1.0 μm) can be suitably used as the column 14 in the present embodiment.

The mass spectrometry unit 20 includes an electron ionization source 22, ion lens 23, quadrupole mass filter 24 and ion detector 25 contained in a vacuum chamber 1. Sample components which have been temporally separated from each other in the column 14 are sequentially introduced into the electron ionization source 22 and ionized by irradiation with thermions emitted from a filament (not shown)

The control-and-processing unit 30 includes a storage section 31, in which a method file to be used for a measurement of PBBs and PBDEs is stored. The method file is a file in which the measurement condition for PBBs and PBDEs is described. The measurement condition for PBBs and PBDEs includes the temperature of the pyrolyzet 12, the temperature of the column 14, the kind and flow rate of the carrier gas, the two kinds of ions (target ion (quantification ion) and qualifier ion (reference ion)) which characterize each of the PBBs and. PBDEs, as well as other related items of information, FIG. 2 shows one example of the measurement condition. In FIG. 2, only the two kinds of ions are shown for each compound. Actually, the information of the mass-to-charge ratio of one or more reserve ions is also stored for each compound in preparation for the case where either the target ion or qualifier ion cannot be used since the mass-to-charge ratio of that ion is too close to the mass-to-charge ratio of an ion generated from a foreign substance contained in the target sample.

The control-and-processing unit 30 includes, as its functional blocks, a standard-sample measurer 32, retention-index calculator 33, relative-response-factor calculator 34 and database creator 35. The control-and-processing unit 30 is actually a commonly used personal computer, on which those functional blocks are embodied by running a previously installed program for database creation device on a processor. An input unit 36 for a user to perform input operations, and a display unit 37 for displaying various kinds of information, are connected to the control-and-processing unit 30.

2. Procedure for Creating Relative-Response-Factor Database

Figure 3:
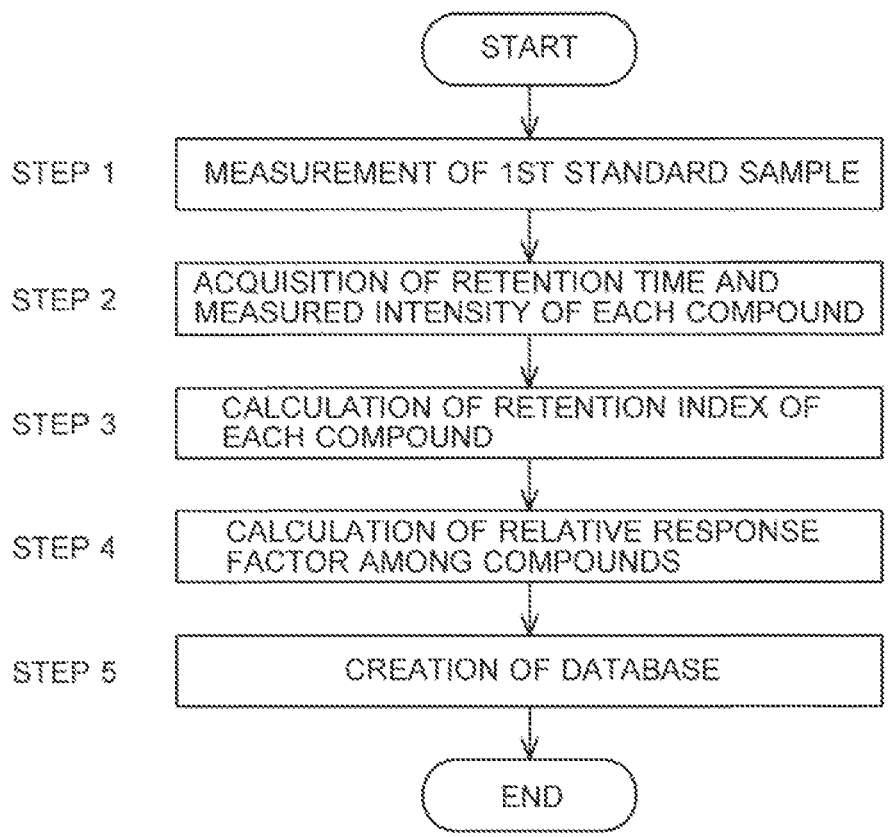
FIG. 3 is a flowchart showing a procedure for preparing a relative-response-factor database in the present embodiment.

Next, the procedure for creating a relative-response-factor database is described with reference to the flowchart in FIG. 3.

Initially, the PUN and PBDSs which are the target compounds are mixed in known quantities into a polymer solution to prepare a standard sample (first standard sample). In order to facilitate the calculation of the relative response factor (which will be described later), it is preferable that the PBBs and PBDEs be contained in equal quantities, although this is not always necessary. In the present embodiment, a polymer solution is used as a basis for preparing the standard sample since the purpose of the present embodiment is the screening of polymer products regulated under the RoHS directive, as noted earlier. The form of the standard sample can be appropriately determined according to the shape and qualities of the target samples.

A user introduces the standard sample into the pyrolyzer 12 and issues a command to initiate the measurement. Then, the standard-sample measurer 32 reads the method tile stored in the storage section 31 and conducts a measurement of the standard sample (first standard sample) based on the measurement condition described in the method file (Step 1). Initially, the pyrolyzer 12 is heated to vaporize the PBBs and PBDEs contained in the standard sample. The vapor is carried into the column 14 by a flow of carrier gas. The PBBs and PBDEs are temporally separated from each other in the column 14 according to the magnitude of their interaction with the liquid phase, and ultimately exit from the column 14. The compounds which have exited from the column 14 are sequentially introduced into the electron ionization source 22.

The ions generated in the electron ionization source 22 are converged by the ion lens 23 into the vicinity of the central axis (ion beam axis C) of the direction of flight and enter the quadrupole mass filter 24, which separates the ions according to their mass-to-charge ratios. The separated ions are detected by the ion detector 25. The output signals from the ion detector 25 are sequentially sent to and stored in the storage section 31.

During the measurement of the standard sample, a scan measurement and selected ion monitoring (SIM) measurements are repeated in the mass spectrometry unit 20. Specifically, a scan measurement in which the mass-to-charge ratio of the ion to be allowed to pass through the quadrupole mass filter 24 is continuously varied over a predetermined range of mass-to-charge ratios (e.g., from 50 to 1000 in m/z), and 40 kinds of SIM measurements in each of which the mass-to-charge ratio of the ion to be allowed to pass through the quadrupole mass filter 24 is fixed at the mass-to-charge ratio of either the target ion or qualifier ion of one of the compounds for a predetermined period of time, are repeatedly performed as one set of measurements. It should be noted that the scan measurement is not indispensable; it is possible to repeatedly perform only the SIM measurements.

Apart from the measurement of the standard sample, a measurement of an n-alkane sample is also performed. An n-alkane sample is a standard sample containing a plurality of compounds which are different from each other in terms of the length of the hydrocarbon chain. This sample is used to obtain a retention index with reference to the retention time of each compound. As described in Non Patent Literature 1, the retention index $I_x$ of compound "x" is expressed by the following equation (1):

$$I_x = 100(C_{n+1} - C_n)\{(t_x - t_n)/(t_{n+1} - t_n)\} + 100C_n \quad (1)$$

where and $C_n$ and $C_{n+1}$ are the carbon numbers of two n-alkanes whose retention times are located before and after the retention time of the compound concerned, $t_x$ is the retention time of compound "x", $t_n$ and $t_{n+1}$ are the retention times of the n-alkanes whose retention times are located before and after the retention time of the compound concerned.

After the measurement of the standard sample, the standard-sample measurer 32 creates a total ion current chromatogram (TIC) based on the scan measurement data, as well as mass chromatograms based on the SIM measurement data. After these chro chromatograms have been created, the retention-index calculator 33 determines the retention time and measured intensity for each compound (Step 2). The retention time of a compound is determined based on the position of the peak top of a peak which appears at the same retention time in both the mass chromatogram of the target ion and that of the qualifier ion designated for the compound concerned. After the retention time of each compound has been determined, the retention index of each compound is calculated with reference to the retention times of the compounds contained in the n-alkane sample (Step 3).

Subsequently, the relative-response-factor calculator 34 computes the relative response factor (RRF) which represents the relationship among PBBs and PBDEs (a total of 20 kinds of compounds) in terms of the measured intensity (Step 4). As described in Patent Literatures 1-3 and Non Patent Literature 1, the relative response factor $RRF_{a/x}$ of compared compound "a" relative to reference compound "'x" is expressed by the following equation (2):

$$RRF_{a/x} = RF_a / RF_x \quad (2)$$

where $RF_a$ and $RF_x$ are the response factors of compared compound "a" and reference compound "x", respectively.

The response factor of compared compound "a" is expressed by the following equation (3). It should be noted that the following formulae apply to not only compared compound "a" but also reference compound "x".

$$RF_a = A_a/m_a \quad (3)$$

where $A_a$ and $m_a$ are the peak area of compared compound "a" in the mass chromatogram and the mass (mg) of the same compound, respectively. The mass $m_a$ of compared compound "a" is expressed by the following equation (4):

$$m_a = M \times C_a \quad (4)$$

where M and $C_a$ are the mass (kg) of the standard sample and the concentration (mg/kg) of compared compound "a" in the standard sample, respectively. As can be understood from equation (3), when a standard sample which contains PBBs and PBDEs in equal quantities is used, the ratio of the peak area of each compound can be directly used as $RRE_{a/x}$, which facilitates the calculation of the relative response factor.

The relative-response-factor calculator 34 designates each of the 20 compounds as reference compound "x" and determines the relative reference factors of the other compounds by selecting each of these other compounds as compared compound "a". Thus, as shown in FIG. 4, relative response factors for all combinations of the 20 compounds (relative-response-factor matrix) are obtained.

After the previously described processing by the retention-index calculator 33 and the relative-response-factor calculator 34 has been completed, the database creator 35 relates the retention indices of the compounds and the aforementioned relative response factors to the method the used in the measurement, and stores those pieces of information as a relative-response-factor database in the storage section 31 (Step 5).

The previously described measurements and processing are similarly performed for other analyzers which are of the same type (Py-GC-MS) as the Py-GC-MS 1, to lculate the relative response factors for all combinations of the compounds and create a relati response-factor database for each analyzer. The control-and-processing unit 30 reads this database. When the relative-response-factor database obtained by another analyzer has been read, the database creator 35 extracts a combination of the reference compound and the compared compound which gives a small variation in the relative response factor between the analyzers. The extracted combination is shown on the screen of the display unit 37. The variation in the relative response factor can be evaluated, for example, by the % RSD value of the relative response factors obtained from the measurements using the analyzers. The % RSD, which is called the "coefficient of variation", is a percentage value representing the standard deviation divided by the arithmetic mean. When the coefficient of variation is used for evaluating the variation in the value of the relative response factor, it is preferable to select a combination of the reference compound and the compared compound with which the coefficient of variation related to each relative response factor becomes equal to or lower than 20. A coefficient of variation that exceeds 20 means a considerable variation between the analyzers, in which case the quantitative values may possibly contain a significant error and lower the screening accuracy.

The user refers to the combinations shown on the display unit 37 and selects a reference compound as well as a compared compound to be related to that reference compound. After all compounds have been selected as either a reference compound or compared compound, the database creator 35 stores the selection result in the storage section 31. FIG. 5 shows an example of the relative response factor to be stored in the storage section 31. In the present embodiment, Tetra-BDE, Penta-BDE, Deca-BDE and Deca-BB are selected as reference compounds. The description "Absolute Calibration" in FIG. 5 (and other figures) means that the compound concerned is a reference compound, whose quantity should be calculated using a calibration curve in the measurement of a target sample (which will be described later). FIG. 6 shows a result of the calculation of the % RSD of each of the relative response factors obtained by performing the previously described processing by four Py-GC-MSs 1, using each device three times, The data of the relative response factors thus created are stored in an appropriate type of record medium(e.g., CD-ROM or USB memory) so that they can be used in a Py-GC-MS 100 (which will be described later).

In the present embodiment, the selection of the reference compounds has been determined taking into account the fact that a standard sample containing those compounds in known quantities, which is used in the measurement of a target sample (which will be described later), can be easily procured, in addition to the fact that those compounds give a comparatively small variation in the relative response factor between the analyzers. For example, the certified reference material ERM-EC591 is widely used as a standard sample containing PBBs and PBDEs. The certified reference material ERM-EC591 contains Tri-BDE, Tetra-BDE, Penta-BDE, Hexa-BDE, Hepta-BDE, Octa-BDE, Deca-BDE and Deca-BB. Among these compounds, Tetra-BDE, Penta-BDE, Deca-BDE and Deca-BB are contained in large quantities (245-780 mg/kg). According to the RoFIS directive, the total amount of PBBs o PBDEs should not exceed 1000 ppm (1000 mg/kg). Therefore, it is preferable that a compound contained in the standard material at a concentration close to that value be selected as a reference compound. This method reduces an error in the relative response fnctor due to a difference in measurement sensitivity caused by a concentration difference (or other factors).

3. Configuration of Py-GC-MS thr Measurement of Target Samples

Figure 7:
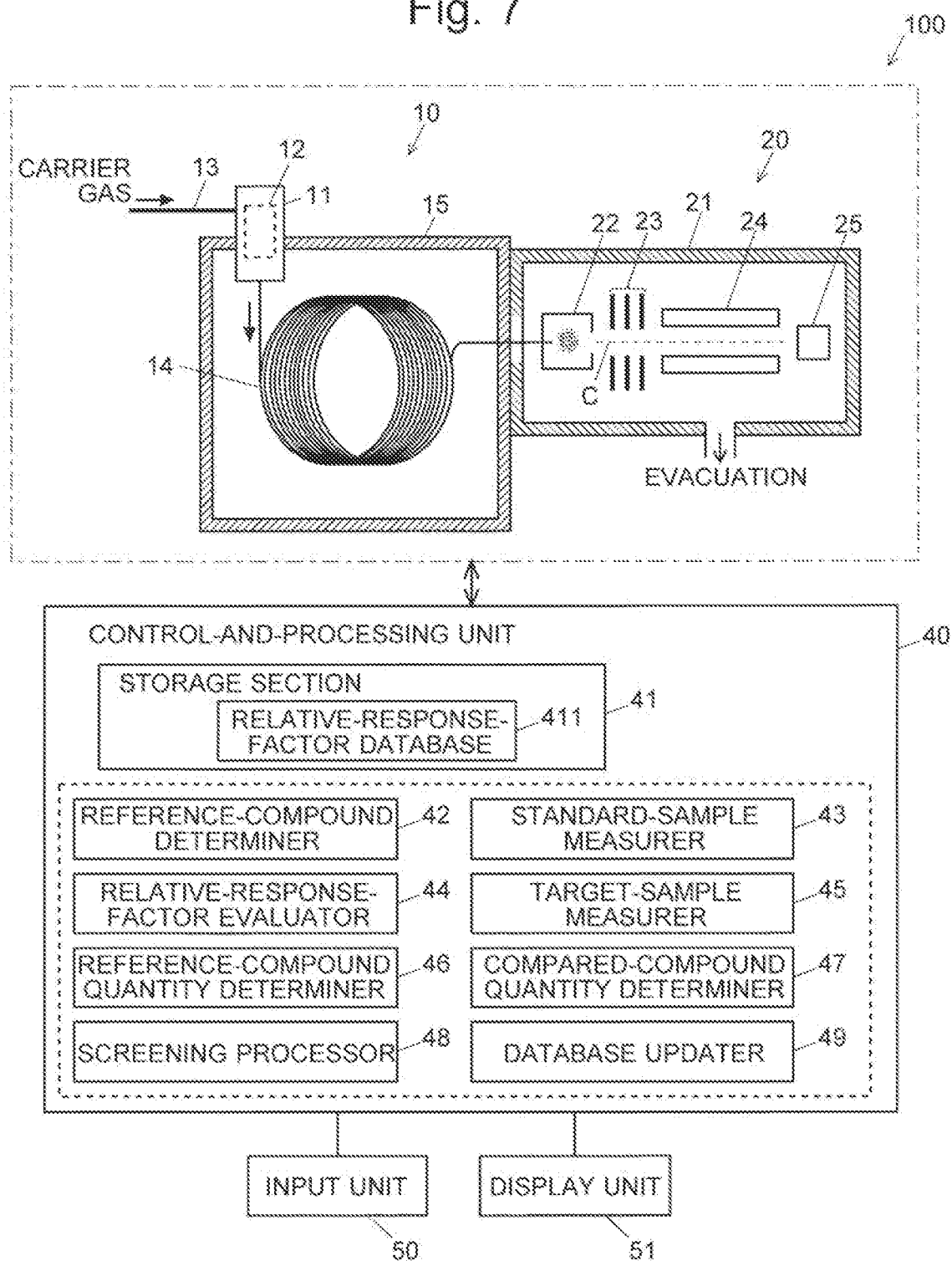
FIG. 7 is a configuration diagram showing the main components of one embodiment of a quantitative determination device for brominated flame-retardant compounds according to the present invention.

FIG. 7 is a configuration diagram of the main components of a Py-GC-MS 100 (second analyzer) to be used for the screening of target samples in the present embodiment. The configurations of the gas chromatograph unit 10 and the mass spectrometry unit 20 are identical to those shown in FIG. 1. Accordingly, the following description only deals with the configuration of the control-and-processing unit 40. As for the gas chromatograph unit 10 and the mass spectrometry unit 20, it should be noted that they only need to be of the same type as the analyzer used for the creation of the relative-response-factor database (in the present case, a gas chromatograph mass spectrometer); they do not always need to be perfectly identical in the latter device. For example, the mass filter in the mass spectrometry unit 20 may be a different type of device (e.g., an ion trap or time-of-flight mass separator).

The control-and-processing unit 40 includes a storage section 41. In this storage section 41, the relativesponse-factor database 411 (the relative-response-factor matrix in FIG. 4 and the relative-response-factor table in FIG. 5) which has been created and stored in the record medium by the analyzer previously described with reference to FIGS. 1 and 3 is read and stored, being related to the measurement condition (FIG. 2). The control-and-processing unit 40 also includes, as its functional blocks, a reference-compound determiner 42, standard-sample measurer 43, relative-response-factor evaluator 44, target-sample measurer 45, reference-compound quantity deterr finer 46, compared-compound quantity determiner 47, screening processor 48 and database updater 49. The control-and-processing unit 40 is actually a commonly used personal computer, on which the aforementioned functional blocks are embodied by running a previously installed target sample measurement program on a processor. An input unit 50 for a user to perform input operations, and a display unit 51 for displaying various kinds of information, are connected to the control-and-processing unit 40.

4. Procedure for Screening Target Sample

Figure 8:
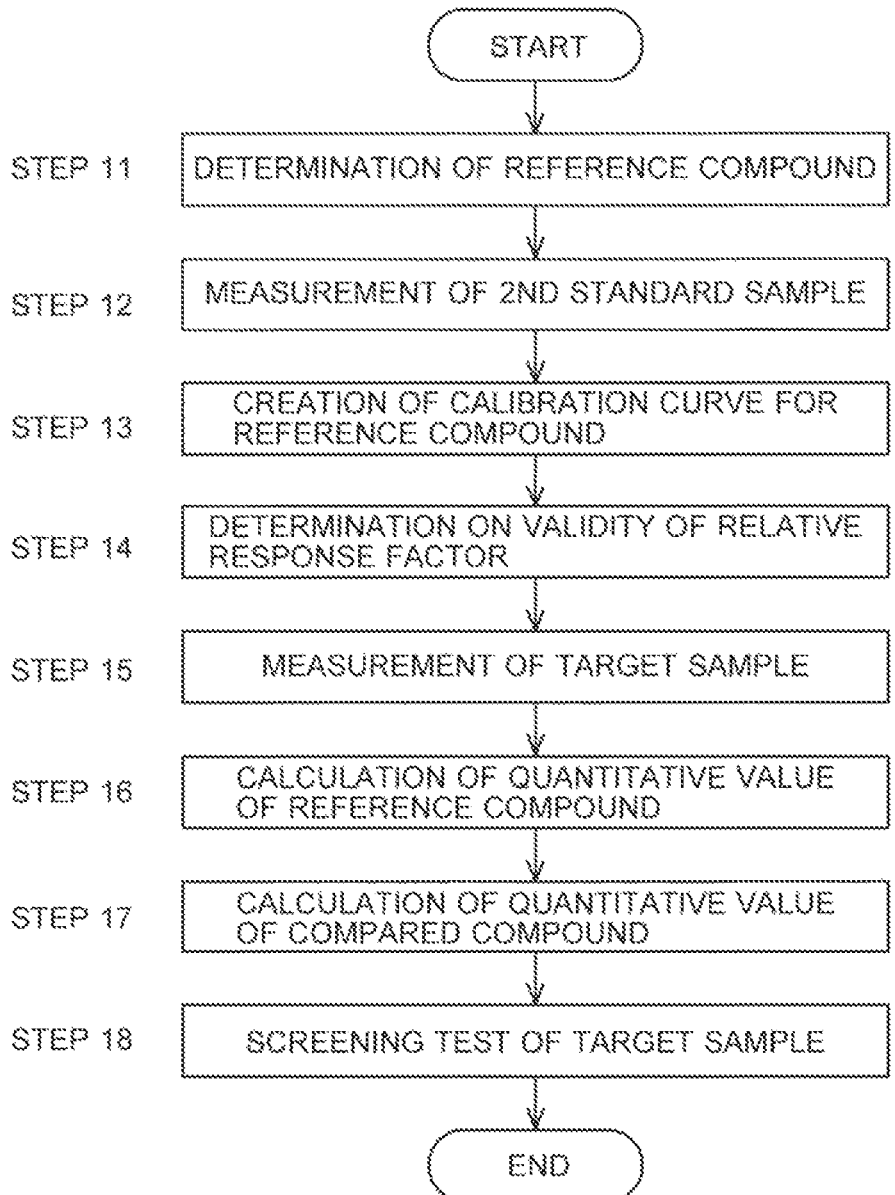
FIG. 8 is a flowchart showing a procedure for determining the quantity of a compound contained in a target sample using a relative-response-factor database in the present embodiment.

Next, the procedure for screening a target sample is described with reference to FIG. 8.

The user issues a command to it itiate the screening of a target sample. The reference-compound determiner 42 reads the relative-response-factor database 411 from the storage section 41 and displays, on the display unit 51, the relative-response-factor table (FIG. 5) contained in the database. The user checks this table and modifies the correspondence relationship between the reference compound and the compared compound as needed. For example, when it is difficult to procure a standard sample which contains a reference compound selected in the relative-response-factor table, the compound concerned may be removed from the selection of the reference compounds, or another compound may be designated as a reference compound. When the correspondence relationship between the reference compound and the compared compound has been modified, the reference-compound determiner 42 refers to the relative-response-factor matrix (FIG. 4) and changes the relative-response-factor table to the one correspond to the modified selection of the reference compounds. After the selection of the reference compounds by the user has been completed, the designation of the reference compounds is finalized (Step 11). In the present example, no modification is made to the selection of the reference compounds; Tetra-BDE, Penta-BDE, Deca-BDE and Deca-BB remain designated as the reference compounds.

Next, a measurement of a standard sample (second standard sample) whichcontains the reference compounds (Tetra-BDE, Penta-BDE, Deca-BDE and Deca-BB) in known quantities is performed, using the measurement condition (concerning the measurement of the reference compounds) described in the method file related to the relative-response-factor database (Step 12). The certified standard material ERM-EC591 mentioned earlier can suitably be used as the standard sample.

After the measurement of the reference compounds has been completed, a calibration curve is created for each reference compound (Step 13). In the present example, a single standard sample is subjected to the measurement, and a one-point calibration curve is created. In the case where the quantity of the reference compound and its measured intensity are non-linearly related, a plurality of standard samples which differ from each other in terms of the contents of the reference compounds may be subjected to the measurement to create a calibration curve based on two or more measurement points, From the four aforementioned reference compounds, the relative-response-factor evaluator 44 selects one compound (e.g., Tetra-BDE) as the reference compound and another compound (e.g., Penta-BDE) as the compared compound, and obtains the relative response factor from the relative-response-factor table. Meanwhile, it calculates the area of the mass peak in the chromatogram obtained by the measurement of the standard sample and calculates a quantitative value, using the calculated area and the relative response factor. Then, it compares the calculated quantitative value with the quantity of the reference compound actually contained in the standard sample, to determine whether or not the degree of coincidence of the two values is within a predetermined range. For example, this predetermined range is defined as a range of plus or minus 30% from the actual content. If the calculated quantitative value falls within this range, it is determined that the relative response factor is valid (Step 14). On the other hand, if the calculated quantitative value is outside that range, the processing is suspended, and the user is prompted to perform maintenance of the apparatus, once more select the reference compound, once more create the relative-response-factor database, or use another relative-response-factor database if there is such a database stored in the storage section 41.

After the calibration curve for the reference compound has been created, the user sets a target sample and issues a command to initiate the measurement. Then, the target-sample measurer 45 conducts a measurement of the target sample, using the measurement condition described in the method file related to the relative-response-factor database 411 (Step 15). Apart from the measurement of the standard sample, a measurement of the n-alkane sample is also performed. Once again, the scan measurement is not indispensable for the measurement of the target sample; it is possible to perform only the SIM measurements. However, performing the scan measurement makes it possible to check the thereby created total ion current chromatogram for any significant peak other than the target compound. If such a peak has been detected, the mass spectra acquired at the retention time of that peak can be analyzed to identify the compound corresponding to that peak.

After the measurement of the target sample has been completed, the reference-compound quantity determiner 46 determines the peaks of the mass chromatograms of the target ion and the qualifier ion of each reference compound, based on the retention index of the reference compound, or on a predicted retention time calculated from the retention index and the measurement data of the n-alkane sample. Then, it refers to the calibration curve of the reference compound concerned to determine the quantitative value corresponding to the peak area of the target ion (Step 16).

After the quantitative value of the reference compound has been obtained, the compared-compound quantity determiner 47 determines the peaks of the mass chromatograms of the target ion and the qualifier ion of each compared compound, based on the retention index of the compared compound, or on a predicted retention time calculated from the retention index and the measurement data of the n-alkane sample. Then, it determines the quantitative value of each compared compound based on the quantity of the reference compound contained in the standard sample, the peak area of the target ion of the reference compound detected by the measurement of the standard sample, as well as the peak area and relative response factor of the target ion of the compared compound (Step 17).

After the quantitative values for the reference compound and the compared compound have been obtained, the screening processor 18 performs the screening of the target sample by comparing those quantitative values with previously specified thresholds, in the present embodiment, based on the aforementioned criterion in the RoHS directive (i.e., the total amount of PBBs and PBDEs should not exceed 1000 ppm), a screening test is performed to determine whether or not the total of the quantitative values of the PBBs and PBDEs contained in the target sample is within a range of plus or minus 70% from the reference value (Step 18). Specifically, if the total of the quantitative values of the PBBs and PBDEs contained in the target sample is equal to or less than 300 ppm, it is concluded that the target sample satisfies the criterion in the ROHS directive. On the other hand, if the total quantity of the PBBs and PBDEs is equal to or greater than 1700 ppm, it is concluded that the target sample does not satisfy the criterion in the RoHS directive. If the total quantity of the PBBs and PBDEs is within a range from 300 ppm to 1700 ppm, the conclusion is reserved, and a detailed analysis of the target sample is performed by a different technique to calculate the quantitative value more accurately.

Figure 9:
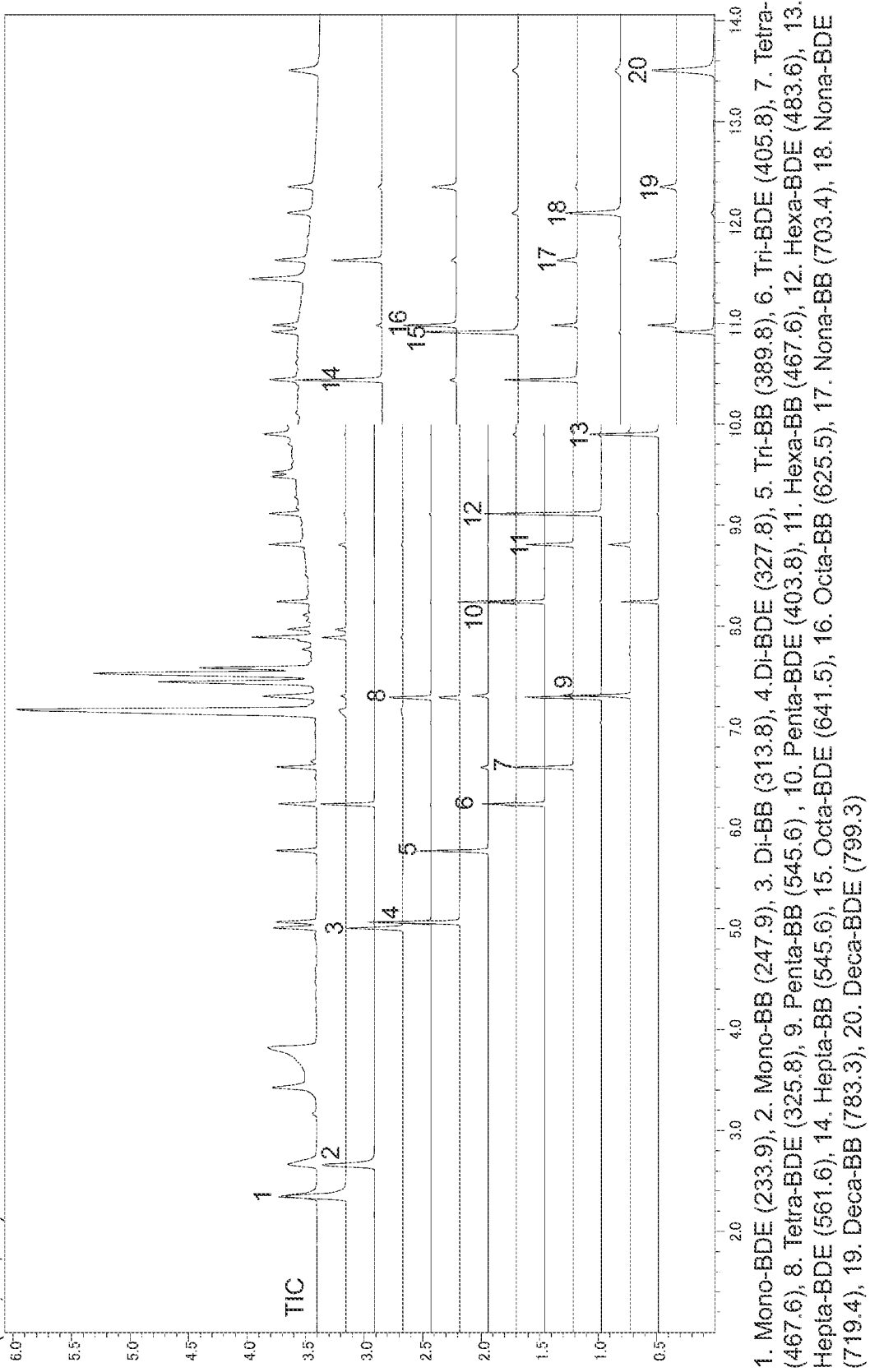
FIG. 9 is an example of a total ion current chromatogram and mass chromatograms acquired in the present embodiment.

FIGS. 9 and 10 show the result of a measurement of real samples according to the previously described embodiment, in this measurement, the target sample was prepared by putting a polystyrene solution into a sample cup so that the amount of polymer would be 0.5 mg, and subsequently adding a mixed solution of PBBs and PBDEs to the sample cup so that the concentration of each compound in the polymer would be 500 mg/kg (except for Deca-BDE, whose concentration was 1000 mg/kg).

FIG. 9 is a total ion current chromatogram obtained for the target sample and mass chromatograms of the compounds concerned. FIG. 10 shows the quantitative value of each compound determined by the procedure explained in the previous embodiment and the recovery rate calculated for each compound.

The "Concentration Value" in the table in FIG. 10 is the actual content of each of the PBBs and PBDEs in the target sample, while the values shown underneath are the quantitative values determined by the method according to the previously described embodiment. The "Recovery Rate" in the table shows the proportion of each quantitative value to the actual content. This rate corresponds to the measurement error. In this measurement result, the recovery rates of the compounds were within a range from 92 to 124%. The recovery rates for the total quantity of the PBBs and that of the PBDEs were 105% and 109%, respectively. These values, and particularly, the recovery rates for the total quantity of the PBBs and that of the PBDEs are sufficiently accurate for the screening of the target sample with respect to the RoHS directive.

The Py-GC-MS 100 according to the present embodiment can be used not only for the screening test using the relative-response-factor database 411 created by using another analyzer and stored in the storage section 41; the Py-GC-MS 100 itself can also be used for the creation of the relative-response-factor database 411. In the case of creating a new relative-response-factor database 411, the necessary functional blocks can be embodied by running the database creation program described for the Py-GC-MS 1. When a data file of a relative-response-factor database created by another analyzer has been read, the database updater 49 stores the new relative-response-factor database in the storage section 41.

In some cases, the target sample may contain foreign compounds whose presence was not expected when the relative-response-factor database was created. If those foreign compounds include a compound which produces an ion whose mass-to-charge ratio is close to that of the target ion or qualifier ion designated for any one of the target compounds, that foreign compound will also be involved in the measurement, making it impossible to obtain a correct value of the measured intensity for the target compound concerned. In such a case, it is necessary to designate, as the target ion or quantifier ion, an ion whose mass-to-charge ratio is different from that of the ion originating from the foreign compound concerned.

When the user issues a command to change the setting of the target ion or qualifier ion, the database updater 49 reads the relative-response-factor database 411 stored in the storage section 41 and displays the measurement condition on the screen of the display unit 51. The user selects the target ion or qualifier ion of a compound to be changed from the displayed measurement condition. Then, the database updater 49 displays input fields for the mass-to-charge ratio of an ion to be newly designated as the target ion or qualifier ion, and the ratio of the measured intensity of the newly designated target ion or qualifier ion to that of the previous ion. When those values have been inputted by the user, the mass-to-charge ratio of that target ion or qualifier ion is updated. The relative response factor of the compound concerned is also updated with the value which equals the original value multiplied by the aforementioned ratio. Furthermore, the method file is updated so that the newly designated ion will be designated as the target ion or qualifier ion for the measurement.

The previously described embodiment is a mere example and can be appropriately changed or modified along the gist of the present invention. In the previously described embodiment, the measurement condition used for creating a relative-response-factor database using the Py-GC-MS 1 is identical to the one used for the screening test of a target sample using the Py-GC-MS 100. Actually, they do not always need to be completely identical. However, measurement parameters which affect the relative relationship of the measured intensities among the compounds need to be common to both cases. Examples of such parameters include measurement parameters concerning the heating of a sample by the pyrolyzer 12, polarity of the column 11, heating temperature of the column 14 by the column oven 15, ionization method and ionization condition (e.g., energy of electron ions). In other words, the "predetermined condition" in the present invention should include conditions concerning these measurement parameters.

FIGS. 11-13 show an example in which the relative-response-factor database was created under a different measurement condition, using the Py-GC-MS 1 according to the previously described embodiment. The measurement condition in this example was optimized so as to shorten the period of time for extracting compounds by the pyrolyzer (FIG. 11). The difference between the measurement condition shown in FIG. 2 and the one shown in FIG. 11 exists in the measurement parameter concerning the heating of the sample by the pyrolyzer 12. In FIG. 2, the temperature of the pyrolyzer 12 is gradually increased to 340 degrees Celsius and maintained at this level for one minute. In FIG. 11, the pyrolyzer 12 is instantaneously heated to 340 degrees Celsius from the beginning and maintained at this level for three minutes. FIG. 12 shows the relative response factor of each target compound determined under the present measurement condition. FIG. 13 shows the % RSD value of each relative response factor. Thus, a plurality of relative-response-factor databases corresponding to a plurality of sets of measurement conditions which are different from each other in anent parameters that affect the relative relationship of the measured intensities among the target compounds can be stored in the storage section 41 so that a suitable measurement condition for the target sample can be used for the screening test.

In the previous et bodiment, the target compounds of the measurement were PBBs and PBDEs. A similar configuration to the previously described embodiment can also be used for the measurement of other kinds of compounds. For example, the relative response factor can also be determined beforehand in a similar manner for a compound whose structure or qualities are similar to those of any one of the compounds selected as the reference compounds in the previously described embodiment, i.e., Tetra-BDE, Penta-BDE, Deca-BDE and Deca-BB. This allows for the quantitative determination or screening of that compound contained in a target sample. In the case of a measurement using a Py-GC-MS as in the previously described embodiment, phthalate esters, Tetrabromobisphenol A (TBBPA) and Hexabromocyclododecane (HBCDD) can be named as examples of the aforementioned type of compounds. These compounds have also been regulated under various regulations on chemical substances. Preparing relative-response-factor databases including these compounds allows the screening test of target samples in conformity to various regulations on chemical substances to be efficiently performed. FIG. 14 shows the correspondence relationship of HBCDD and TBBPA to a reference compound as well as their relative response factors in the case where the measurement condition shown in FIG. 2 was used. Similarly, FIG. 15 shows the correspondence relationship of HBCDD and TBBPA to the reference compound as well as their relative response factors in the case where the measurement condition shown in FIG. 11 was used.

The measurement technique is not limited to GC/MS described in the previous embodiment. Various measurement techniques can be used provided that the target compounds can be individually subjected to the measurement. For example, it is possible to adopt a configuration in which a chromatography using only a chromatograph apparatus (e.g., gas chromatography or liquid chromatography combined with spectrometry or other appropriate techniques for detecting each component) is performed, and the compounds separated from each other in the column is individually subjected to the measurement. It is also possible to use only a mass spectrometer and perform the measurement for an individual ion having a mass-to-charge ratio characteristic of each compound.

[Modes]

A person skilled in the art can understand that the previously described illustrative embodiments are specific examples of the following modes of the present invention.

(Clause 1)

A quantitative determination device for bro ininated flame-retardant compounds according to one mode of the present invention includes:

a storage section holding a relative response factor which represents a relationship of an intensity per unit quantity of a compared compound measured under a predetermined condition, to an intensity per unit quantity of a reference compound measured by a predetermined analyzing method under the predetermined condition, where the reference compound is one of a plurality of target compounds which constitute a portion or the entirety of the group of polybrominated biphenyls and polybrominated diphenyl ethers, while the compared compound is one of the target compounds different from the reference compound;

an analyzer configured to analyze a sample by the predetermined analyzing method;

a standard-sample measurer configured to acquire an intensity of the reference compound by performing a measurement of a standard sample under the predetermined condition, using the analyzer, with the standard sample containing the reference compound in known quantity;

a target-sample measurer configured to acquire intensities of the reference compound and the compared compound contained in a target sample by performing a measurement of the target sample under the predetermined condition, using the analyzer;

a reference-compound quantity determiner configured to determine a quantitative value of the reference compound contained in the target sample, based on the quantity of the reference compound contained in the standard sample, the intensity of the reference compound acquired by the standard-sample measurer, and the intensity of the reference compound acquired by the target-sample measurer; and a compared-compound quantity determiner configured to determine a quantitative value of the compared compound, based on the quantity of the reference compound contained in the standard sample, the intensity of the reference compound acquired by the standard-sample measurer, the intensity of the compared compound acquired by the target-sample measurer, and the relative response factor of the compared compound.

The quantitative determination device for brominated flame-retardant compounds according to Clause 1 is used for the quantitative determination of a plurality of target compounds which constitute a portion or the entirety of the group of polybrominated biphenyls (PBBs) and polybrominated diphenyl ethers (PBDEs) contained in a target sample. In advance of the measurement of a target sample, one or more reference compounds are selected from the PBBs and PBDEs, and a first standard sample, which contains the reference compounds and compared compounds at known concentrations, is subjected to a measurement using an analyzer (first analyzer). Then, a relative response fitctor which represents a relationship of a measured intensity (first intensity) per unit quantity of each compared compound to a measured intensity (first intensity) per unit quantity of a reference compound is determined.

For a measurement of a target sample, a calibration curve is initially created by a measurement of a standard sample (second standard sample) containing reference compounds at known concentrations, using an analyzer (second analyzer) with which the measurement of the target sample is to be performed. As for this standard sample, for example, ERM-EC591 can be used, which is a commercially available certified standard material widely used for the quantitative determination of brominated flame-retardant compounds. When ERM-EC591 is used as the standard sample, the reference compounds should be selected from the PBBs and PBDEs contained in this sample. After the measurement of the target sample has been completed, the quantitative value of a reference compound is determined by using the calibration curve, and the quantity value of each compared compound is subsequently determined based on the quantity of the reference compound contained in the standard sample, the measured intensity (second intensity) of the reference compound obtained by the measurement of the standard sample, as well as the measured intensity (third intensity) and relative response factor of the compared compound obtained by the measurement of the target sample. Thus, in the quantitative determination device for brominated flame-retardant compounds according to Clause 1, the relative response factor of each compared compound to a reference compound is determined beforehand. After that, the task of preparing a calibration curve for each analyzer (second analyzer) is perforrred only for that reference compound. Therefore, when it is difficult to procure a mixed solution containing all kinds of PBBs and PBDEs and prepare calibration curves, or when a plurality of analyzers of the same type are used, the quantities of the brominated flame-retardant compounds can be conveniently determined.

(Clause 2)

In the quantitative determination device for brominated flame-retardant compounds described in Clause 1, Tetra-BDE, Penta-BDE, Deca-BDE and Deca-BB are designated as the reference compound.

(Clause 3)

The quantitative determination device for brominated flame-retardant compounds described in Clause 1 or 2 may be configured as follows:

the relative response factors of Mono-BDE, Di-BDE, Tri-BDE, Mono-BB, Di-BB, Tri-BB and Tetra-BB are stored, with Tetra-BDE as the reference compound;

the relative response factors of Hexa-BDE, Hepta-BDE, Penta-BB, Hexa-BB and Hepta-BB are stored, with Penta-BDE as the reference compound;

the relative response factors of Octa-BDE and Nona-BDE are stored, with Deca-BDE as the reference compound; and the relative response factors of Octa-BB and Nona-BB are stored, with Deca-BB as the reference compound.

(Clause 12)

Another mode of the present invention is a computer readable record medium recording data to be used for the quantitative determination, by chromatography-mass spectrometry, of target compounds which are polybrominated biphenyls and polybrominated diphenyl ethers, where the recorded data have a data structure in which a relative response factor that is the information of an intensity per unit quantity of a compared compound measured by chromatography-mass spectrometry under a predetermined condition is related to an intensity per unit quantity of a reference compound measured under the predetermined condition, where Tetra-BDE, Penta-BDE, Deca-BDE and Deca-BB are designated as the reference compound, while the compared compound is one of the target compounds and is different from the reference compound.

(Clause 13)

In the computer readable record medium described in Clause 12, the recorded data may have a data structure in which;

the relative response factors of Mono-BDE, Di-BDE, Tri-BDE, Mono-BB, Di-BB, Tri-BB and Tetra-BB are related to Tetra-BDE;

the relative response factors of Hexa-BDE, Hepta-BDE, Penta-BB, Hexa-BB and Hepta-BB are related to Penta-BDE;

the relative response factors of Octa-BDE and Nona-BDE are related to Deca-BDE; and the relative response factors of Octa-BB and Nona-BB are related to Deca-BB.

ERM-EC591, which is a commercially available certified standard material, contains Tetra-BDE, Penta-BDE, Deca-BDE and Deca-BB in large quantities (245-780 mg/kg), According to a criterion in the RoHS directive, the total amount of PBBs or PBDEs should not exceed 1000 ppm (1000 mg/kg). In the quantitative determination device for brominated flame-retardant compounds described in Clauses 2 and 3 as well as the computer readable record medium described in Clauses 11 and 12, since a compound contained in the standard material at a concentration close to 1000 ppm (1000 mg/kg) is selected as a reference compound, an error in the relative response factor due to a difference in measurement sensitivity caused by a concentration difference (or other factors) can be further reduced.

(Clause 4)

In the quantitative determination device for brominated flame-retardant compounds described in one of Clauses 1-3, the relative response factor which represents the relationship of the intensity per unit quantity of the compared compound to the intensity per unit quantity of the reference compound may be stored for each of a plurality of the predetermined conditions which are different from each other.

(Clause 14)

In the computer readable record medium described in Clause 12 or 13, the recorded data have a data structure in which the relative response factor representing the relationship of the intensity per unit quantity of the compared compound to the reference compound is related to each of a plurality of the predetermined conditions which are different from each other.

With the quantitative determination device for brominated flame-retardant compounds described in Clause 4 and the computer readable record medium described in Clause 14, it is possible to select a suitable measurement condition for a target sample from a plurality of measurement conditions which are different from each other in terms of a measurement parameter that affects the relative relationship of the measured intensities among compounds, and to use a relative response factor corresponding to the selected condition.

(Clause 5)

In the quantitative determination device for brominated flame-retardant compounds described in one of Clauses 1-4, the predetermined condition may be an execution of a chromatographic analysis and/or a mass spectrometric analysis.

In the quantitative determination device for brominated flame-retardant compounds described in Clause 5, in the case of a chromatographic analysis, the measured intensities of the reference and compared compounds can be individually acquired by separating these compounds within a column. In the case of a mass spectrometric analysis, the measured intensities of the reference and compared compounds can be individually acquired by detecting an ion having different characteristic mass-to-charge ratio for each compound.

(Clause 6)

In the quantitative determination device for brominated flame-retardant compounds described in one of Clauses 1-5, the predetermined condition may include performing a chromatographic analysis using a non-polar column.

In the quantitative determination device for brominated flame-retardant compounds described in Clause 6, the use of the non-polar column enables a simultaneous analysis of the polybrominated biphenyls and the polybrominated diphenyl ethers.

(Clause 7)

The quantitative determination device for brominated flame-retardant compounds described in one of Clauses 1-6 may be configured as follows:

the predetermined condition includes performing a mass spectrometric analysis;

the relative response factor is related to each of a plurality of combinations of the mass-to-charge ratio of the reference compound and the mass-to-charge ratio of the compared compound; and the target-sample measurer is configured to receive an input for selecting one of the plurality of combinations, and to perform a mass spectrometric analysis using the combination selected by the input.

With the quantitative determination device for brominated flame-retardant compounds described in Clause 7, the measured intensities of the reference and compared compounds can be acquired by detecting an ion having characteristic mass-to-charge ratio for each compound.

(Clause 8)

In the quantitative determination device for brominated flame-retardant compounds described in one of Clauses 1-7, the target compounds may further include one or more compounds different from the polybrominated biphenyls and the polybrominated diphenyl ethers.

The quantitative determination device for brominated flame-retardant compounds described in Clause 8 allows for the quantitative determination of a compound other than the PBBs and PBDEs.

(Clause 9)

In the quantitative determination device for brominated flame-retardant compounds described in one of Clauses 1-8, the one or more compounds may include a compound selected from phthalate ester compounds, Tetrabromobisphenol A and Hexabromocyclododecane.

With the quantitative determination device for brominated flame-retardant compounds described in Clause 9, the screening of target samples in conformity to the RoHS directive and other regulations on chemical substances can be efficiently performed.

(Clause 10)

The quantitative determination device for brominated flame-retardant compounds described in one of Clauses 1-9 may further include a screening processor configured to determine whether or not the quantitative value of the reference compound and/or the quantitative value of the compared compound is within a predetermined range.

The quantitative determination device for brominated flame-retardant compounds described in Clause 10 can conveniently perform the screening of a target sample without requiring a judgment by the user.

(Clause 11)

The quantitative determination device for brominated flame-retardant compounds described in one of Clauses 1-10 may be configured as follows:

the relative response factor of a second reference compound relative to a first reference compound among the plurality of reference compounds is stored in the storage section; and the quantitative determination device further includes a relative-response-factor evaluator configured to evaluate the validity of the relative response factor by comparing, with the known quantity of the second reference compound contained in the standard sample, a quantitative value of the second reference compound calculated based on the known quantity of the first reference compound contained in the standard sample, a measured intensity of the first reference compound and a measured intensity of the second reference compound obtained by the standard-sample measurer, as well as the relative response factor of the second reference compound.

The quantitative determination device for brominated flame-retardant compounds described in Clause 11 can accurately determine the quantity of a target compound after determining whether or not the relative response factor is appropriate.

REFERENCE SIGNS LIST 1, 100 . . . Pyrolyzer Gas Chromatograph Mass Spectrometer (Py-GC-MS)
10 . . . Gas Chromatograph Unit
11 . . . Sample Vaporization Chamber
12 . . . PyTolyzer
13 . . . Carrier Gas Passage
14 . . . Column
15 . . . Column Oven
20 . . . Mass Spectrometry Unit
21 . . . Vacuum Chamber
22 . . . Electron Ionization Source
23 . . . Ion Lens
24 . . . Quadrupole Mass Filter
25 . . . Ion Detector
30 . . . Control-and-Processing Unit
31 . . . Storage Section
32 . . . Standard-Sample Measurer
33 . . . Retention-Index Calculator
34 . . . Relative-Response-Factor Calculator
35 . . . Database Creator
40 . . . Control-and-Processing Unit
41 . . . Storage Section
411 . . Relative-Response-Factor Database
42 . . . Reference-Compound Determiner
43 . . . Standard-Sample Measurer
44 . . . Relative-Response-Factor Evaluator
45 . . . Target-Sample Measurer
46 . . . Reference-Compound Quantity Determiner
47 . . . Compared-Compound Quantity Determiner
48 . . . Screening Processor
49 . . . Database Updater

The invention claimed is:

1. A quantitative determination device for brominated flame- retardant compounds, comprising:
a storage section holding a relative response factor which represents a relationship of an intensity per unit quantity of a compared compound measured by a predetermined analyzing method under a predetermined condition, to an intensity per unit quantity of a reference compound measured by thea predetermined analyzing method under the predetermined condition, where the reference compound is one of a plurality of target compounds which constitute a portion or an entirety of a group of polybrominated biphenyls and polybrominated diphenyl ethers, while the compared compound is one of the target compounds different from the reference compound;
an analyzer configured to analyze a sample by the predetermined analyzing method;
a standard-sample measurer configured to acquire an intensity of the reference compound by performing a measurement of a standard sample under the predetermined condition, using the analyzer, with the standard sample containing the reference compound in known quantity;
a target-sample measurer configured to acquire intensities of the reference compound and the compared compound contained in a target sample by performing a measurement of the target sample under the predetermined condition, using the analyzer;
a reference-compound quantity determiner configured to determine a quantitative value of the reference compound contained in the target sample, based on the quantity of the reference compound contained in the standard sample, the intensity of the reference compound acquired by the standard-sample measurer, and the intensity of the reference compound acquired by the target-sample measurer; and
a compared-compound quantity determiner configured to determine a quantitative value of the compared compound, based on the quantity of the reference compound contained in the standard sample, the intensity of the reference compound acquired by the standard-sample measurer, the intensity of the compared compound acquired by the target-sample measurer, and the relative response factor of the compared compound.

2. The quantitative determination device for brominated flame-retardant compounds according to claim 1, wherein a plurality of the reference compounds are designated, and the plurality of the reference compounds are tetrabrominated diphenyl ether (Tetra-BDE), pentabrominated diphenyl ether (Penta-BDE), decabrominated diphenyl ether (Deca-BDE) and decabrominated biphenyl (Deca-BB).

3. The quantitative determination device for brominated flame-retardant compounds according to claim 1, wherein
the relative response factors of monbrominated diphenyl ether (Mono-BDE), dibrominated diphenyl ether (Di-BDE), tribrominated diphenyl ether (Tri-BDE), monobrominated biphenyl (Mono-BB), dibrominated biphenyl (Di-BB), tribrominated biphenyl Tri-BB and tertabrominated biphenyl (Tetra-BB) are stored, with Tetra-BDE as the reference compound;
the relative response factors of hexabrominated diphenyl ether (Hexa-BDE), heptabrominated diphenyl ether (Hepta-BDE), pentabrominated biphenyl (Penta-BB), hexabrominated biphenyl (Hexa-BB) and heptabrominated biphenyl (Hepta-BB) are stored, with Penta-BDE as the reference compound;
the relative response factors of octabrominated diphenyl ether (Octa-BDE) and nonabrominated diphenyl ether (Nona-BDE) are stored, with Deca-BDE as the reference compound; and
the relative response factors of octabrominated biphenyl (Octa-BB) and nonabrominated biphenyl (Nona-BB) are stored, with Deca-BB as the reference compound.

4. The quantitative determination device for brominated flame-retardant compounds according to claim 1, wherein the relative response factor which represents the relationship of the intensity per unit quantity of the compared compound to the intensity per unit quantity of the reference compound is stored for each of a plurality of the predetermined conditions which are different from each other.

5. The quantitative determination device for brominated flame-retardant compounds according to claim 1, wherein the predetermined analyzing method is chromatography and/or mass spectrometry.

6. The quantitative determination device for brominated flame-retardant compounds according to claim 1, wherein the predetermined condition includes performing a chromatographic analysis using a non-polar column.

7. The quantitative determination device for brominated flame-retardant compounds according to claim 6, wherein the target compounds comprises one or more compounds selected from phthalate-ester compounds, Tetrabromobisphenol A and Hexabromocyclododecane.

8. The quantitative determination device for brominated flame-retardant compounds according to claim 1, wherein:
the predetermined condition includes performing a mass spectrometric analysis;
the relative response factor is related to each of a plurality of combinations of the mass-to-charge ratio of the reference compound and the mass-to-charge ratio of the compared compound; and
the target-sample measurer is configured to receive an input for selecting one of the plurality of combinations, and to perform a mass spectrometric analysis using the combination selected by the input.

9. The quantitative determination device for brominated flame-retardant compounds according to claim 1, wherein the target compounds further include one or more compounds different from the polybrominated biphenyls and the polybrominated diphenyl ethers.

10. The quantitative determination device for brominated flame-retardant compounds according to claim 1, further comprising a screening processor configured to determine whether or not the quantitative value of the reference compound and/or the quantitative value of the compared compound is within a predetermined range.

11. The quantitative determination device for brominated flame-retardant compounds according to claim 1, wherein:
a plurality of the reference compounds are pre-determined,
the relative response factor of a second reference compound relative to a first reference compound among the plurality of reference compounds is stored in the storage section; and
the quantitative determination device further includes a relative-response-factor evaluator configured to evaluate a validity of the relative response factor by comparing, with the known quantity of the second reference compound contained in the standard sample, a quantitative value of the second reference compound calculated based on the known quantity of the first reference compound contained in the standard sample, a measured intensity of the first reference compound and a measured intensity of the second reference compound obtained by the standard-sample measurer, as well as the relative response factor of the second reference compound.

* * * * *